(12) United States Patent
Johnson et al.

(10) Patent No.: US 8,239,757 B2
(45) Date of Patent: Aug. 7, 2012

(54) SYSTEM AND METHOD FOR CREATING AND MODIFYING TEST DATA FILES

(75) Inventors: Thomas H. Johnson, Bozeman, MT (US); Peter A. Quinlan, Colorado Springs, CO (US); Kevin R. Fletcher, Belgrade, MT (US)

(73) Assignee: Zoot Enterprises, Inc., Bozeman, MT (US)

( * ) Notice: Subject to any disclaimer, the term of this patent is extended or adjusted under 35 U.S.C. 154(b) by 571 days.

(21) Appl. No.: 11/916,268

(22) PCT Filed: Jun. 14, 2006

(86) PCT No.: PCT/US2006/023289
§ 371 (c)(1),
(2), (4) Date: Feb. 4, 2008

(87) PCT Pub. No.: WO2006/138450
PCT Pub. Date: Dec. 28, 2006

(65) Prior Publication Data
US 2009/0164941 A1     Jun. 25, 2009

(51) Int. Cl.
*G06F 17/00* (2006.01)
(52) U.S. Cl. .................... 715/237; 715/770

(58) Field of Classification Search ............ 715/237, 715/770
See application file for complete search history.

(56) References Cited

U.S. PATENT DOCUMENTS

| | | | |
|---|---|---|---|
| 5,778,390 A * | 7/1998 | Nelson et al. | 1/1 |
| 5,862,319 A | 1/1999 | Galetti | |
| 6,038,378 A | 3/2000 | Kita et al. | |
| 6,219,802 B1 | 4/2001 | Beeker et al. | |
| 6,430,708 B1 | 8/2002 | Evans | |
| 6,880,109 B2 | 4/2005 | Belenger et al. | |
| 2005/0066263 A1* | 3/2005 | Baugher | 715/500 |
| 2005/0246390 A1 | 11/2005 | House et al. | |

* cited by examiner

*Primary Examiner* — Andrey Belousov
(74) *Attorney, Agent, or Firm* — Antoinette M. Tease

(57) ABSTRACT

A system and method for creating and modifying test data files. The system comprises a parse map editor and a test data file editor, wherein parse maps are created and edited in the parse map editor, wherein the system parses incoming data files based on the parse maps that are created in the parse map editor, wherein each incoming data file is matched to a parse map, wherein the parsed data files are sent to the test data file editor, and wherein the test data file editor allows a user to view and edit the parsed data files. The method comprises parsing an incoming data file with a parse map, creating and/or editing the parse map in a parse map editor, and viewing and/or editing the parsed data file in a test data file editor.

46 Claims, 4 Drawing Sheets

FIGURE 1

SYSTEM AND METHOD FOR CREATING AND MODIFYING TEST DATA FILES

CROSS-REFERENCE TO RELATED APPLICATION

Pursuant to 35 U.S.C. §119(e), this application claims the benefit of U.S. Patent Application No. 60/691,059 filed on Jun. 16, 2005, the contents of which are incorporated herein by reference.

BACKGROUND OF THE INVENTION

1. Field of the Invention

This application relates generally to the field of information technology, and more specifically, to a system and method for creating and modifying test data files including special test cases for a particular computer program.

2. Description of the Related Art

The production of a computer program or the automation of a business process generally includes several stages, including a developmental phase and a testing phase. The testing phase is essential to ensure that the application logic of the automated business process (created during the development phase) functions in an expected and reliable manner. Such a testing phase becomes even more critical when the application logic of the automation involves functionality that demands accuracy and precision, such as financial algorithms or authorization/security algorithms.

The current process for granting credit in the United States generally involves a number of processes, including, but not limited to, the entry of application data (or inquiry data) into an automated system, the parsing of that data, the issuance of a request for additional data associated with the applicant, the running of business rules associated with the bank's credit policy, the rendering of a decision to grant or not to grant credit to the applicant, the determination of lending parameters (including loan amount, interest rate and term), and the booking of the loan on a loan servicing system. The inquiry data may come from a variety of sources. For example, the data may be entered automatically into a lending platform from an Internet portal, or it may be entered manually from a handwritten loan application or information provided to a call center. The inquiry data is the starting point for a loan application, and it is used to pull additional data from other sources.

Because the processing of a loan application involves pulling data from sources other than the initial loan application, any test data files used to test the business logic of the automated decisioning process must incorporate data from these external sources. Under these circumstances, finding or creating test data files that will test every facet of the application logic of a computer program can be tedious, laborious, and time-consuming. Software developers often spend countless hours creating and hand-editing test data files or, alternatively, rely on a volume test that might miss certain conditions, such as obscure or special test cases.

For example, in the financial industry, most large or mid-sized financial institutions have at least some form of automated decisioning process (e.g., application logic) in their credit-granting operations. The decisioning process often involves taking bank rules and lending policies and incorporating them into an automated system that gathers external data, aggregates that data, and uses it to provide automated decisions. The automated system applies the institution's business rules and policies to recommend whether a bank or financial institution should offer credit to an applicant, and, if so, on what terms the credit should be offered.

Accurately assessing a borrower's ability and willingness to pay back loaned money requires personal experience and knowledge of the borrower, or comprehensive and indicative information on the borrower's finances and behavior in the business community. For large financial institutions, it is impossible to have a personal relationship and understanding of each customer's propensity to repay a loan. Federal and state governments have also enacted laws that require financial institutions to ensure all clients are treated equitably and consistently. As a financial institution gets larger, this becomes more and more difficult to do based on personal relationships.

The majority of financial institutions in the United States have gone to using credit bureau data and a consistent credit policy for making decisions on granting credit for their clients. The larger institutions have gone one step further by automating the decisioning process through the use of computer code that gathers all applicable data points from a consumer's credit application and from other sources of indicative information, including credit bureau information, fraud databases, collateral valuation services, and others. Institutions can then evaluate the information through a set of logical business and lending policy rules. These systems are called "decision engines" or "business rules engines," and they give the institutions that use them a significant competitive advantage by lowering operating costs and improving the quality and consistency of credit decisions.

Requesting and analyzing a credit file or other indicative information is one of the core components of an automated or manual decisioning process. Typically, consumer credit files consist of information on the applicant's credit history, which is primarily used within the decisioning process. The credit risk managers for the financial institution are responsible for ensuring that the decisions made by the automated system are correct and accurate. These credit risk managers are responsible for the decisioning process, which, if functioning improperly, could result in the loss of hundreds of millions of dollars.

Currently, financial institutions rely mainly upon three major consumer credit bureaus for supplying credit information regarding an applicant. The data that is sent by the bureaus is complex and difficult to interpret due to the variance in and inconsistent nature of each borrower's data and the need for the bureaus to be able to send as much data as possible in the smallest, most efficient transmission possible. Each financial institution has a unique way of selecting which data providers (or combination of data providers) to use and how to aggregate the raw credit bureau data into usable data points called attributes. There is an entire industry devoted to determining the statistically most relevant data in a credit file and how that data should be aggregated and scored to provide a true indicator of a customer's propensity to repay a loan. The accurate and efficient testing of automated, aggregated logic, as well as business policy rules, is critical to the operation and profitability of a large financial institution.

The use of the three major consumer credit bureaus for supplying credit files further complicates the testing process. Each consumer credit bureau has its own format for credit files stored within a respective repository. These consumer credit bureaus frequently change the format of the credit files to meet legal requirements or to provide additional value to their customers. Consequently, the format of the credit file is complex and subject to change. Data on individual consumers is continually updated as financial institutions send updated performance information for each consumer. Most major institutions require the ability to pull credit files from all three major consumer credit bureaus and the flexibility to change the preferred bureau used based on a variety of factors.

For testing purposes, the three major consumer credit bureaus provide sample credit files in their particular format to be used by financial institutions that have decisioning logic programs. Unfortunately, the sample credit files provide very limited test data for testing the many aspects of the decisioning logic, and they are also subject to change without notice. Moreover, the sample credit files are not geared toward a specific lender's criteria and, therefore, cannot be used to test all of the varying aspects of the lender's decisioning logic, especially the aspects of the decisioning logic that represent situations that do not occur on a regular basis.

The existing process for testing automated decisioning logic includes the use of test data files provided by each credit bureau or the use of real consumer files that have been previously pulled by the financial institution from the consumer credit bureaus. Such test data files from the credit bureaus are limited and subject to change without notice. More importantly, the financial institution attempting to test the decisioning logic does not have direct control over the content of the test data files provided by the consumer credit bureaus. Due to laws relating to privacy protection and the increased concern by consumers over privacy issues, the use of real consumer files that have been previously pulled by the financial institution from the consumer credit bureaus is now under general review.

In addition, using the test data files provided by credit bureaus and/or real consumer files previously pulled by the financial institution to test the decisioning logic of a computer program is insufficient because those files cannot possibly provide enough data to completely test all of the decisioning logic and corresponding conditions. Some of the conditions of the decisioning logic can be extremely rare, occurring less than once in 10,000 credit files; however, the consequence of that piece of logic being wrong in a production environment could mean the loss of hundreds of thousands of dollars each time it is encountered, depending on the size of loans being approved by the automated system.

Financial institutions generally create a test bed of test data files for testing decisioning logic. The test bed of test data files typically includes test data files provided by credit bureaus and/or real consumer files previously pulled by the financial institution, as described above. Without a known result for each test data file and a stable test set, automated regression testing is extremely difficult and time-consuming. Currently, the only option is to create a sufficient test bed of test data files, run them through the system, and then have the financial institution manually review each automated decision and compare it with hand-calculated results to ensure that the decisioning logic is making the correct decision. The current process does not provide adequate or comprehensive testing of automated decisioning systems. In addition, the labor necessary to provide even the current limited testing is expensive and inefficient.

What is needed is a system and method for creating and modifying test data files in an efficient, accurate, and automated manner, such that the test data files encompass all of the conditions within the application logic of the computer program. It is to such a device that the present invention is primarily directed.

A principle object of the present invention is to provide a system and method for creating and modifying test data files needed to accurately test every aspect of a computer program's application logic.

Another object of the present invention is to provide a system and method for creating and modifying test data files in the native format for the specific data file being used.

Still another object of the present invention is to provide a system and method for creating and modifying test data files that includes an automated test data file builder that builds files based on the data aggregation logic used in the automated system.

It is another object of the present invention to provide a system and method for defining and parsing complex data structures for easy editing and conversion of new or modified data formats and for creating test data files from such new or modified data formats.

Another object of the present invention is to provide a system and method for creating and modifying test data files that include a test data file storage unit, adapted to permit users to build a reusable library of test data files, that can be called by an automated decision engine in the same manner as a call to the actual data provider.

Still another object of the present invention is to provide a system and method for creating and modifying test data files, wherein segments or portions of the test data files may be stored in a test data file storage unit for reuse in the creation of future test data files.

It is another object of the present invention to provide a system and method for creating and modifying test data files that include a test data file storage unit adapted to automatically retrieve test file data from the test data file storage unit.

Another object of the present invention is to provide a system and method for creating and modifying test data files that provides the ability to place within the test data file the expected result for that test data file, wherein the expected result can then be displayed as part of the testing process.

Still another object of the present invention is to provide a system and method for creating and modifying test data files that takes actual production data and scrubs any identifying or proprietary information and saves them as test files without altering the performance aspect of the file.

It is another object of the present invention to provide a system and method for creating and modifying test data files, wherein test data files may be combined into test sets that allow the user to create logical sets of files that will test specific portions of the complete decisioning logic.

Another object of the present invention is to provide a system and method for creating and modifying test data files that allows for automated regression testing.

Still another object of the present invention is to provide a system and method for creating and modifying test data files that automates the process of defining and editing inquiry data.

It is another object of the present invention to provide a system and method for creating and modifying test data files that has the ability to translate data files from the native format of one provider to the format of another provider so that the same file can be used to test the logic of a variety of different data providers.

BRIEF SUMMARY OF THE INVENTION

The present invention is a system and method for creating and modifying test data files. The system comprises a parse map editor and a test data file editor, wherein parse maps are created and edited in the parse map editor, wherein the system parses incoming data files based on the parse maps that are created in the parse map editor, wherein each incoming data file is matched to a parse map, wherein the parsed data files are sent to the test data file editor, and wherein the test data file editor allows a user to view and edit the parsed data files. Preferably, an incoming data file is parsed into segments, and the segments are parsed into segment data elements, and the segments and segment data element are displayed in the test data file editor.

In a preferred embodiment, the test data file editor allows users to create and modify the segments and segment data elements. Each segment is preferably displayed on its own screen, and the screen definition for each segment is preferably established by the parse map that is matched to the incoming data file. In a preferred embodiment, the screen for each displayed segment comprises one or more editor tool buttons. Each segment preferably comprises a header, and each segment data element preferably comprises a description. Segments preferably appear in the test data file editor in the order in which they are parsed.

In a preferred embodiment, the system of the present invention further comprises one or more segment seeds, wherein a segment seed is a piece of segment information that can be stored for later use in populating test data files.

In a preferred embodiment, the system of the present invention parses fixed-length, variable-length and delimited data files. In a preferred embodiment, the incoming data files are provided by a data provider, the data provider provides the incoming data files in a native file format, and the system can convert the parsed test data files back to the native file format. In a preferred embodiment, the incoming data files are provided by a data provider, the data provider provides the incoming data files in a native file format, each data provider has its own native file format, and the system can translate an incoming data file into the native file format of another data provider.

In a preferred embodiment, the incoming data files are flat files, and when a user saves a parsed data file, the system converts the parsed data file back into a flat file and saves it in a designated location. The parse maps are preferably xBase files. Preferably, the incoming data files are in either standard or XML file format, and the system automatically determines the file format of the incoming data files. In a preferred embodiment, the incoming data files that are in XML file format are parsed with a Sun Java SAX (Simple API for XML) parser.

In a preferred embodiment, the system of the present invention further comprises an object view tree, wherein the object view tree comprises a parse map tree, and wherein the parse map tree comprises a data directory branch. Preferably, the parse maps that are available to a user are shown in the data directory branch and determined by the user's environment settings. In a preferred embodiment, the incoming data file is matched to a parse map either by the system automatically or by the user by selecting the parse map from a menu.

In a preferred embodiment, the system of the present invention further comprises a test set editor, wherein the test set editor allows a user to create and save a group of test data files in a test set. In a preferred embodiment, the system of the present invention further comprises a test data file storage unit, wherein a test data file can be saved to the test data file storage unit after it is viewed or modified in the test data file editor.

In a preferred embodiment, the system of the present invention identifies personal data elements in each incoming data file, and a replacement or scrambling routine adjusts the data in each one of the personal data elements so that the file can be used for testing purposes without any actual personal data. In a preferred embodiment, the parsed data files are run through a decisioning engine to provide results that can be used in an automatic regression evaluation or for manual review. In a preferred embodiment, batch testing can be used to simulate an actual production run.

The method of the present invention comprises parsing an incoming data file with a parse map, creating and/or editing the parse map in a parse map editor, and viewing and/or editing the parsed data file in a test data file editor. In a preferred embodiment, each incoming data file is matched to a parse map, and the parsed data files are sent to the test data file editor. Preferably, an incoming data file is parsed into segments, and the segments are parsed into segment data elements. The segments and segment data element are preferably displayed in the test data file editor.

In a preferred embodiment, the test data file editor allows users to create and modify the segments and segment data elements. Preferably, each segment is displayed on its own screen, and the screen definition for each segment is established by a parse map that is matched to the incoming data file. In a preferred embodiment, the screen for each displayed segment comprises one or more editor tool buttons. Each segment preferably comprises a header, and each segment data element preferably comprises a description. Segments preferably appear in the test data file editor in the order in which they are parsed.

In a preferred embodiment, a segment can be broken down into one or more segment seeds, wherein a segment seed is a piece of segment information that can be stored for later use in populating test data files.

In a preferred embodiment, the incoming data file is a fixed-length data file, a variable-length data file, or a delimited data file. In a preferred embodiment, the incoming data files are provided by a data provider, the data provider provides the incoming data files in a native file format, and the parsed test data files can be converted back to the native file format. In a preferred embodiment, the incoming data files are provided by a data provider, the data provider provides the incoming data files in a native file format, each data provider has its own native file format, and an incoming data file can be translated from one native file format to another.

In a preferred embodiment, the incoming data files are flat files, and when a user saves a parsed data file, the parsed data file is converted back into a flat file and saved in a designated location. The parse maps are preferably xBase files. Preferably, the incoming data files are in either standard or XML file format, and the file format of the incoming data file is determined automatically. In a preferred embodiment, the incoming data files that are in XML file format are parsed with a Sun Java SAX (Simple API for XML) parser.

In a preferred embodiment, the method of the present invention further comprises providing an object view tree, wherein the object view tree comprises a parse map tree, and wherein the parse map tree comprises a data directory branch and a database branch. Preferably, the parse maps that are available to a user are shown in the data directory branch and determined by the user's environment settings. In a preferred embodiment, the incoming data file is matched to a parse map either automatically or by a user selecting the parse map from a menu.

In a preferred embodiment, the method of the present invention further comprises providing a test set editor, wherein the test set editor allows a user to create and save a group of test data files in a test set. In a preferred embodiment, the method of the present invention further comprises providing a test data file storage unit, wherein a test data file can be saved to the test data file storage unit after it is viewed or modified in the test data file editor.

In a preferred embodiment, the method of the present invention further comprises scrubbing all personal data from an incoming data file by identifying personal data elements in each incoming data file and using a replacement or scrambling routine to adjust the data in each personal data element. In a preferred embodiment, the parsed data files are run through a decisioning engine to provide results that can be used in an automatic regression evaluation or for manual review. In a preferred embodiment, the method of the present invention further comprises using batch testing to simulate an actual production run.

BRIEF DESCRIPTION OF THE DRAWINGS

FIG. 1 is a screen shot of the object view tree showing a test data file selected and displayed in the test data file editor.

DETAILED DESCRIPTION OF INVENTION

Figure 2:
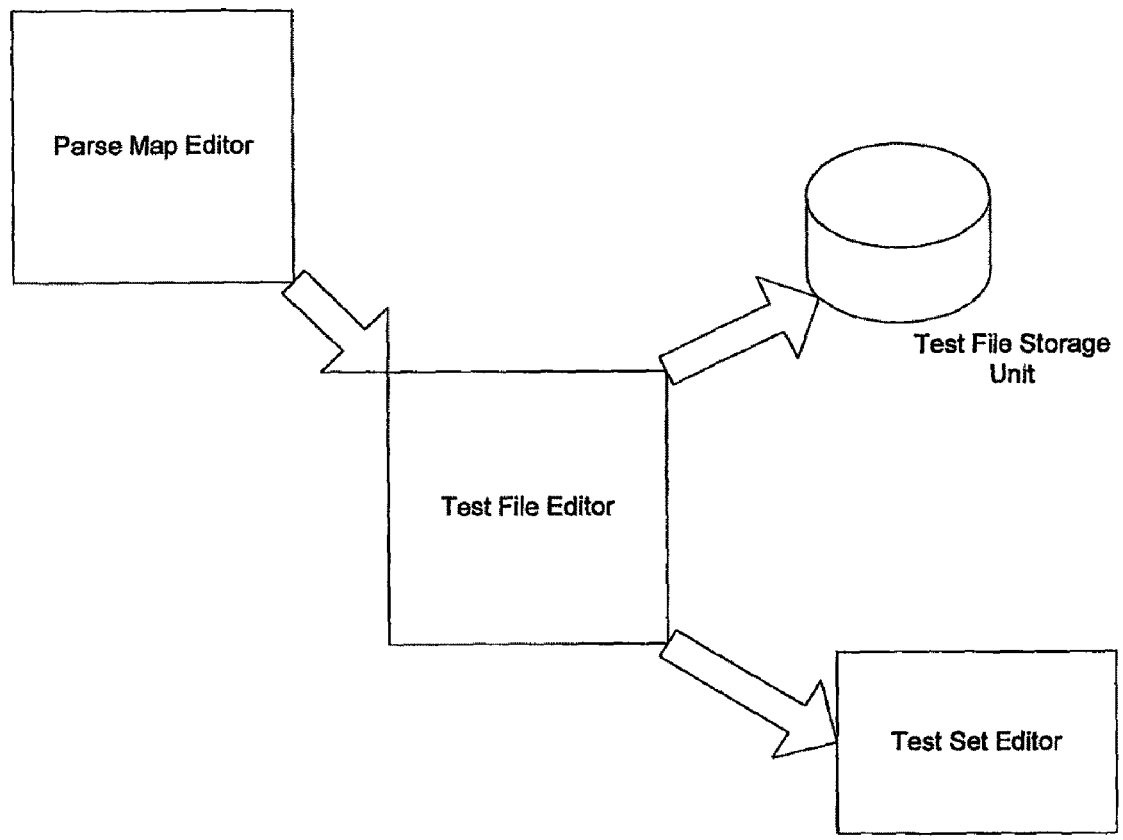
FIG. 2 is a flow diagram of the three editors of the present invention.

The present invention is a system and method for automating the process of testing automated business processes, primarily focused on the creation and/or modification of the data inputs to the automated system, enabling all logic in the automated system to be exercised and audited without the limited and labor-intensive process currently used. The present invention automates the creation of new data files and facilitates the modification of existing data files through the use of an intuitive and easy-to-use graphical user interface (GUI) that allows users to fully test their automated logic.

Data used in automated decisioning systems is complex and varies widely from industry to industry. The present invention enables testing to be facilitated generically so that through an easy-to-use GUI, new data sources can be defined and used for testing. The test data files themselves can be created entirely from scratch or, alternatively, the invention allows for production files (i.e., a client consumer credit file) to be used where protected personal information is scrubbed and data scrambled so that personal information is not disclosed or used in the testing process. The present invention interprets the data aggregation logic and creates test cases that will test all of the positive and negative triggers automatically. Additionally, the present invention provides the ability to initiate the test process and compare results with prior known test results automating the regression testing process.

The present invention specifically allows for the editing and creation of files to accurately and completely test each aspect of the application logic of a computer program. Each test data file may be configured in a particular format necessary for the specific computer program to be properly tested. The present invention provides an automated test data file editor that may be used, as needed, to create and edit one or more test data files to adequately test every aspect of the application logic, including aspects that are rare during normal operation of the computer program.

More specifically, the present invention may include a parse map editor, a test data file editor, a test set editor, and a test data file storage unit for delivering efficient and effective testing of application logic of an automated decisioning system. Supporting internal and external test data file formats, the present invention provides test data files for thorough and accurate testing of application logic, thereby ensuring that the application logic of the computer program is performing as expected. Accordingly, the present invention increases the quality and accuracy of the computer program's application logic while decreasing the risk of inappropriate results or functionality.

The parse map editor is adapted to parse external file formats for easy editing and conversion to a usable test data file format for the subject computer program. By parsing the file, the parse map editor provides a straightforward, easy-to-read, and simple-to-edit format from a potentially complex and difficult-to-navigate native structure. The parse map editor provides the parsed data to the test data file editor for viewing and editing. The parsing algorithm also allows the easy-to-use format to be converted back to the native data file format. The parse map editor and test data file editor provide a more efficient and cost-effective method of generating test data files than the traditional hand-editing of test data files.

The test data file editor is adapted to automatically create and modify test data files for a particular computer program, thereby saving time and money with quicker testing and faster test data file editing. The test data file editor allows for the editing of complete data files or segments (portions) of the file and also allows for the segments to be stored separately as seeds for the creation of other test data files. Further, the anticipated result of processing the test data file by the application logic of the computer program may be stored within the test data file by the test data file editor, so that an automatic determination may be made as to whether the application logic of the computer program is working properly.

The test data file editor may provide an easy-to-use GUI accessible over a network, such as through a web browser accessing the Internet. The test data file editor provides an accurate, comprehensive testing process that gives proof positive that every single criteria of the application logic is being tested properly in both a client side deployment of the computer program or an application service provider (ASP) environment for the computer program. Test data files may be stored locally or remotely for easy access and in a particular format to be used by the computer program. Additionally, segments of the test data files may be stored in the test data file storage unit, thereby providing a library of useful segment seeds that may be used in the creation of other test data files. Accordingly, test data files and segments of the test data files may be viewed or sorted by a user by predetermined characteristics of the test data files and segments of test data files. Every segment or field within an external test data file may be edited by a user, thereby offering accessible and comprehensive testing of the application logic of the computer program.

The test set editor provides the ability to take the test data files that have been created in the test data file editor and combine them together into logical sets for testing of specific decisioning logic or complete decisioning processes. Further, the test set editor allows users to save test sets in a test data file storage unit or in a user-defined location.

The test data file storage unit may be further adapted to permit users to build a reusable library of test data files. This test bed within the test data file storage unit may be stored, searched, and used as a resource by the test data file editor for future testing efforts. Such a library of test data files assists with regression testing of the computer program and allows for a comparison of one or more versions of application logic to determine the differences in results between the different versions of the application logic. Further, the test data file storage unit emulates the actual data repository so that in testing automated systems, the same inquiry can be sent to the test data file storage unit as would be sent in production (i.e., to a credit bureau).

The present invention also enables data files in one native format to be translated into another data file format. This is accomplished by converting one file format to another and/or mapping one or more data files in one file format to one or more data files in another file format. For most types of data, there are several providers that provide very similar data (for example, consumer credit files, business credit files, fraud information appraisals, titles, and flood information) but in different formats. The present invention writes files so that the data from one data provider can be translated to another format. One area where this functionality is commonly needed is with the consumer credit bureaus. Each of these bureaus uses its own "native" formats for its files, which makes translating bureau files from one format to another extremely difficult and not practical for testing. The present invention uses parse maps to interpret the native formats of each data provider and allows that data to be interpreted, displayed, or saved in another format. The system then provides an easy-to-read and easy-to-use format for viewing and editing. This provides a direct comparison by allowing the user to view, understand, and edit the various segments across bureaus.

Further, the present invention has the ability to scrub personal data from a production file and convert the data to a new file that performs (for testing purposes) in the same manner as the production file but that excludes any personal data. This functionality is important in light of current laws protecting the privacy of personal information.

Additionally, based on the attribute logic developed by another computer program, the present invention automatically builds test data files that test the positive data triggers (data values that meet the attribute logic and evaluate as true) and negative data triggers (data values that do not meet the attribute logic and evaluate as false). This allows users to fully test attribute logic without requiring users to randomly review thousands of native test data files or having to individually create the test data files for each condition that is evaluated in the attribute logic. Essentially, this functionality allows users to efficiently test attributes that have been built in another computer program, thereby eliminating the need to manually build all test cases from scratch. The present invention uses a client configuration file to determine from which database to pull attributes. These and other aspects of the present invention are discussed more fully below.

A. Navigation (Object View Tree)

The present invention is divided up into three basic editors and an object view tree, which preferably sits on the left-hand side of the screen and displays all of the objects (or files) that have been created within any of the editors. The editors are displayed as tabs within the screen, and the user can navigate to editors by clicking on the tabs or by selecting specific objects within the object view tree. By selecting an object with the object view tree, the associated editor and selected object will be displayed for editing. If the editor is selected through the tab, the editor will be displayed with a blank object.

The object view tree is a navigation tool that allows users to add and remove objects from the tree view. The tree shows the category, subcategory, and object relationship and lets users expand and collapse the branches of the tree. From the object tree view, users can simply select the object they want to view. When an object is selected from the object view tree, it populates the data in the appropriate editor. For example, test data files are opened in the test data file editor, and parse maps are opened in the parse map editor.

Figure 1:
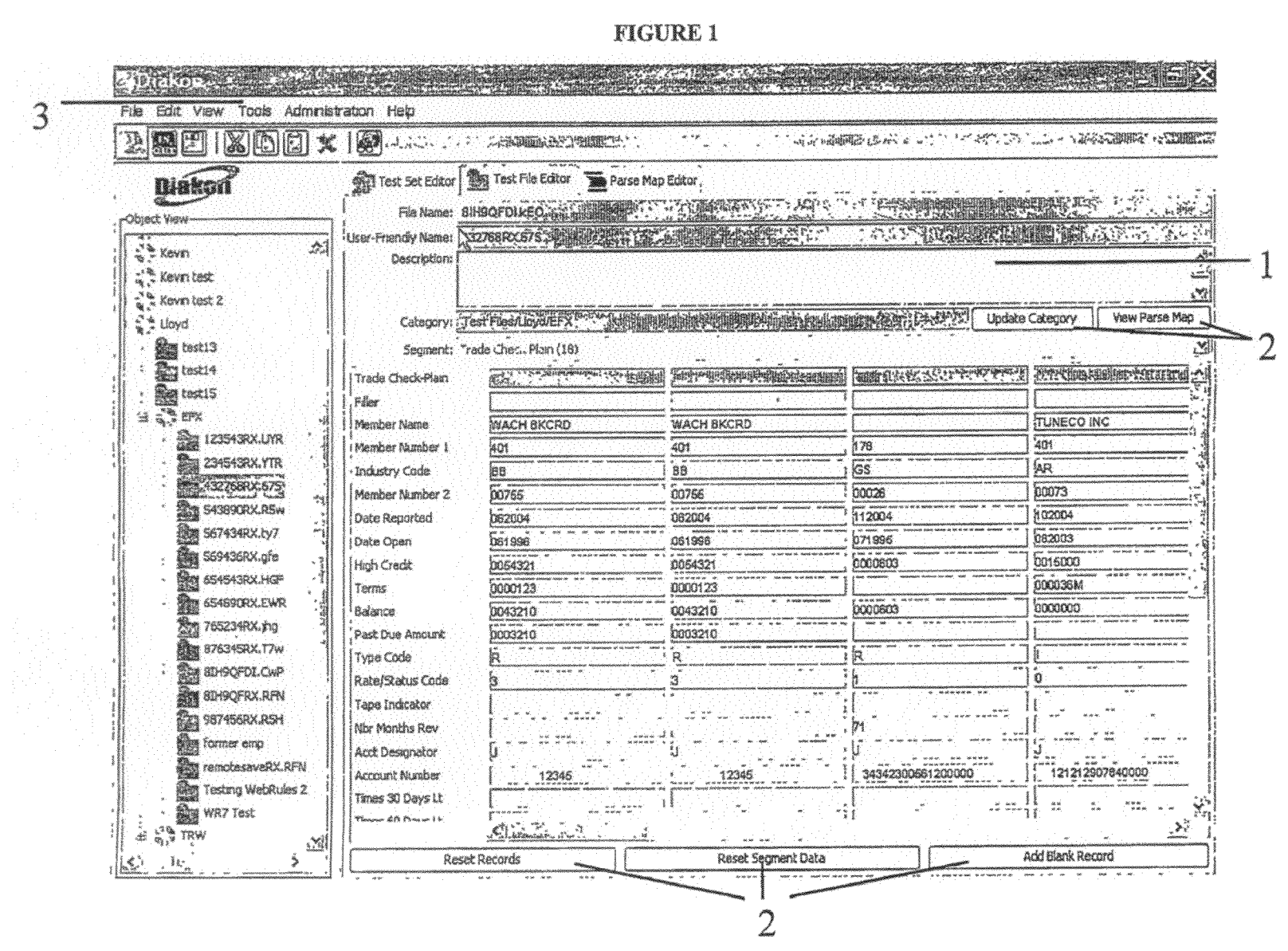

FIG. 1 is a screen shot of the object view tree showing a test data file selected and displayed in the test data file editor. Each editor consists of two major components: the edit window 1, which offers viewing, creation, modification, and deletion capabilities; and the editor tools 2, a series of editor-specific buttons. The menu bar 3 can also be used to navigate from screen to screen within the application. The menu bar 3 is a series of individual drop-down lists that offers numerous functions within the present invention.

It is not uncommon for decision logic testing to involve hundreds of test data files. The Edit > Search function on the menu bar can be used to quickly locate a specific test data file, test case, or parse map from among a vast assortment within the object view. The search pop-up window will appear, and the user can enter a search string to find the desired object. The user may also save search criteria for future use. In addition, test data files, test sets, and parse maps can be imported into the system by clicking File > Open File on the menu bar, and then browsing for the desired file.

In the present invention, any unsaved test data file has no associated category; therefore, all unsaved files are stored in an unassigned category. Once the files are saved to the database, they move into assigned categories. All objects are stored in object groups in memory. When the user retrieves a file from the file system, that file is added to the collection of objects.

In a preferred embodiment, once the file is pulled into the appropriate editor, the application makes a copy of the file rather than modifying the master file. Preferably, any changes must be saved. Saving takes the copy in the editor and updates the master located in the object view. The object view always references the master list that is stored in memory and the object view tree repopulates with the updated master list for additions, renames, and deletions.

B. The Three Editors

The present invention comprises three different editors: the parse map editor, the test data file editor, and the test set editor. FIG. 2 is a flow diagram of the three editors. The parse map editor allows a user to create and edit the parse maps that are used to parse incoming data files. The parsed data files are then sent to the test data file editor, where the user can view and manipulate the test data files. If the user chooses, test data files can be stored in sets in the test set editor. Test data files can also be stored in the test data file storage unit. Each of the three editors is discussed more fully below.

1. The Parse Map Editor

The parse map editor allows the user to view, create, edit and save parse maps. A parse map is a file that reflects the way a test data file is parsed and displayed within the present invention or recompiled from the viewable format to the native format. A parse map is created in the parse map editor. A parse map is created by mapping the data structure of the incoming data file to a more easily understandable data format that can be understood by a decision engine and displayed by the test data file editor.

Viewing a parse map shows the user how the corresponding test data file has been parsed and displayed; editing a parse map allows the user to modify the way the corresponding test data file is parsed and displayed. Structured like a spreadsheet, a parse map displays each data element by header, description, attribute name, length, start and end position, and various other items. Parse maps are used primarily for viewing the contents of a test data file to ensure that they are adequate for the user's testing needs.

Although the present invention is not limited to working with credit bureau files, the parse map editor provides an easy way to adapt to changing formats of credit bureau files. The credit bureau files will be used herein as an example of how the present invention works, but such examples are not intended to limit the application of the present invention. The concepts discussed herein can be used with any test data file.

The test data files that are most commonly used in the credit industry are in a flat file format. In this format, the data is lumped together in a way that makes it very difficult for humans to read or for a decisioning system to run logic. The parse map allows users to take this bundle of hard-to-read data and breaks it down into an easy-to-read, easy-to edit format. Flat files come in a variety of different file types, including fixed-length files, delimited files, and variable-length files. Each data provider can change the type of file it sends, and providers often change the format and content with each new release of their service. The present invention will parse any fixed-length, variable-length or delimited file as long as a parse map exists or is created to read the data. This allows for ultimate flexibility in parsing any type of data regardless of source.

The present invention also allows the parsed data to be converted back into the native (published) format of the data provider without requiring the user to know the native format used. By automatically detecting the file type and matching it with the correct parse map, the present invention enables users to create and edit any test data file regardless of file type or format and without having to understand the bureaus' published format. Even though the data format requirements for each data provider are very defined and rigid, the present invention automatically understands the file type and format, which allows users to view and edit the data however they want.

In a preferred embodiment, there are two basic steps to parsing a test data file. The first step is to parse the file into segments and sub-segments. The second step is to parse the segments and sub-segments into segment data elements. Symbols in the parse map identify whether the file is fixed length, delimited, or variable length. The actual parse maps (which are preferably .dbf files) are stored in memory. When a user loads the parse map, the application logic goes to the specified directory and pulls the .dbf file with the parse map data objects into the object view tree. The parse map editor then parses the segments and determines the lengths of the segments and their type (e.g., header segment, name segment, inquiry segment, or tradeline segment) in order to be able to display them for the test data file editor.

With fixed-length files, each segment has a header with a specified length, and all segments are defined within the parse map. The parse map editor will attempt to match the header length of the first bytes of the test data file to the parse map. For all of the segment data elements in a segment, the combined length of the segment data elements will equal the length of the total segment. For a fixed length file, the total length is the sum of all of the parts. The parse map grabs the whole chunk (based on length) and identifies that chunk as a segment. The parse map then looks for the next segment and continues "parsing" until all segments are pulled out of the test data file. If no parse map matches the test data file, the user will receive an error message that allows the user to specify the location of the parse map he or she wants to use.

If the file is fixed-length format, each segment has a length. The system grabs the designated "number" (or bytes of data) and associates it with the segment data element. If the system does not read a variable length symbol, it reads the file as fixed. If the system does read a variable-length symbol, then it reads the file as variable-length format. The system tracks the next starting position based on the length of the previous segment data. In other words, with the variable length files, length is a distinct attribute for each segment data element, unlike the fixed-length and delimited files, which look to the parse map for length instructions.

With variable-length files, the parse map finds the header name, which has a specified length. The system matches the number of bytes in the header name against the parse map. If the system finds a match, then the parse map identifies how many bytes are in the second element, which is the total segment length. The system confirms that the bytes designate a numeric value, and then that number is used for the total segment length. Once the segment length is determined, the system moves to the next segment and tries to find a match for the length of the segment data. The system proceeds in this manner until all segments have been matched with the parse map.

With delimited files, the parse map editor matches the segment header against the parse map for delimited files. In the parse map, flags are set to designate that the file is a delimited file and identify the delimiter (string of characters). The parse map identifies the delimiter, finds each delimiter, and grabs that chunk of data as a segment.

When users save their information, the system converts the parsed data back into a flat file in the designated location (to the file system, to a remote server, or to a database). If the user is saving a fixed-length file and has typed fewer characters than the specified data character length, the system inserts spaces for the empty characters, thereby ensuring that the parse map continues to match the test data file.

If the user is saving a variable-length file, the present invention calculates the segment length or sub-segment lengths (variable length data elements), recalculates the data lengths, and then writes those into the original segment lengths. By "correcting" the lengths in the test data file, the system ensures that the file continues to match the parse map even if changes are made. If the length of the length attribute is too short, the system will insert zeroes for the empty characters so that the flat file still matches the parse map.

Preferably, the parse maps are xBase files. As used herein, "xBase" is the generic term for all programming languages that derive from the original dBase (Ashton-Tate) programming language, including FoxPro, dBase, Clipper, and others. When saving a parse map, the system converts the xBase file to the appropriate .dbf file.

In the present invention, another type of file that can be parsed out and edited is an XML file. Inquiries, for example, are often in XML format. When the user selects a test data file in the GUI, the system automatically determines the file format (either standard or XML). XML files are not parsed out using the standard .dbf format. Instead, if the file format is XML, the system uses the Sun Java parser with a SAX (Simple API for XML) parser to parse XML files. The Sun Java parser is one example of a parser that can be used to parse XML files, but the present invention is not limited to the use of that parser.

Figure 3:
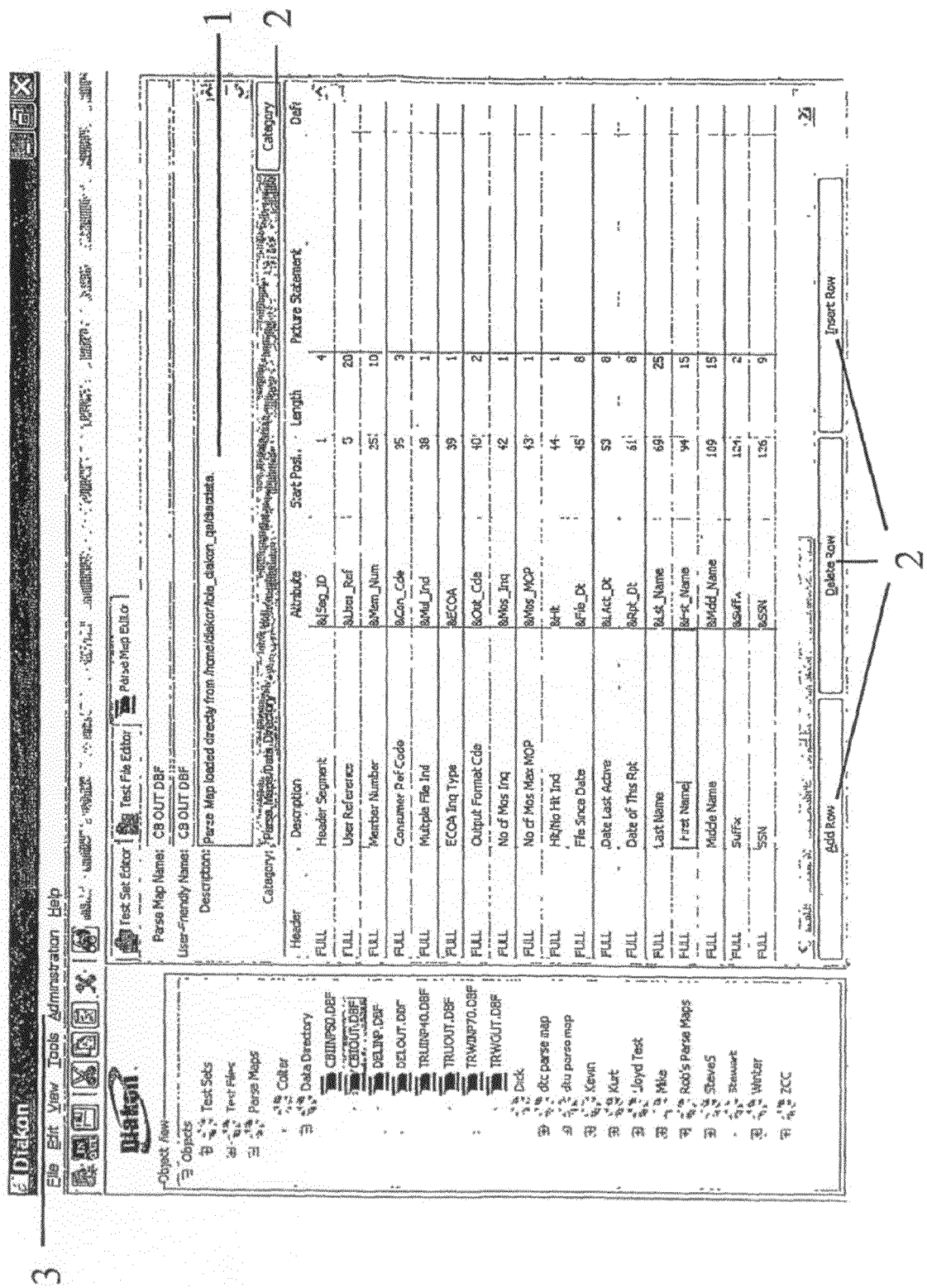
FIG. 3 is a screen shot of the object view tree showing a parse map selected and displayed in the parse map editor.

FIG. 3 is a screen shot of the object view tree showing a parse map selected and displayed in the parse map editor. Each parse map file is preferably broken into a table with several columns, and each column is a segment in the test data file. Preferably, the parse map tree comprises a data directory branch and a database branch. The parse maps that are available to a user are shown in the data directory branch and determined by the user's environment settings.

An optional feature of the present invention allows the user to define user-friendly names for each data element in the data file. These user-defined and easily understood names make it simple for other users to recognize and edit the data in the data file.

2. The Test Data File Editor

The test data file editor is the primary work area for the present invention. This editor allows users to perform all the necessary steps in the test data file building and editing process. The test data file editor is where users create and modify segments in order to test decisioning logic against various data elements and values. In the test data file editor, users load a test data file, associate the test data file with a parse map, and then edit each segment of the test data file separately.

By way of example, the test data file may be a collection of individual data elements that, when combined, simulate an actual credit file from one of the three major credit bureaus. These data elements are organized into segments, which are distinct sections of the overall test data file. With credit bureau information, the segments vary among the bureaus. Common segments are the header segment, name segment, inquiry segment, and tradeline segment.

The test data file editor takes a parsed test data file and displays it in an easily editable form. In the test data file editor, a test data file is matched to a parse map. The system does this automatically by looking for unique characteristics inherent in each data file and matching those characteristics to a specific parse map. The test data file contains a hierarchy of objects that contain segments, sub-segments, and segment data elements. Each segment is displayed on its own screen; for example, the trade segment is displayed and modified on its own screen. The screen definition for each segment is established by the parse map—in other words, whatever the user defines in the parse map is what will be displayed in the screen for that segment.

When a file is parsed, the file is broken into segments based on the parse map. Each segment has a header, and each segment data element has a description. Segments appear in the order in which the parse map parses the information. Based on the parse map, there may be sub-segments. The sub-segments can be fixed length, delimited, or variable length. Fixed length files have fixed lengths; for example, the length may be set to 226 bytes. Variable length files are like "layered" fixed segments. A variable length file contains an overall segment length and may also contain sub-segments with different lengths. Delimited files use special characters to separate segments.

Preferably, when a user loads a test data file into the test data file editor, if the file has not been previously parsed, the test data file editor will attempt to parse the file with all of the available parse maps. If more than one parse map matches the file, a pop-up window appears, allowing the user to select the appropriate parse map. In a preferred embodiment, a parse map is considered a match if it contains three matching segments. If the parse map has fewer than three matching segments, and if fewer than three segments exist for the particular test data file, then a pop-up window allows the user to verify whether the parse map is a match with the test data file.

The test data file editor gives the user the ability to add, delete and edit segments. When the test data file is populated, a segment display panel is created for every segment. At the top of the test data file editor are various fields used to identify and define the test data file, including file name, user-friendly name, category, and segment identifier field. The segment identifier field is a drop-down list of all the available and possible segments in the displayed test data file, and it allows users to choose which segment of the test data file displays below. To select a segment, the user clicks the drop-down arrow and then clicks the desired segment. The various segment fields (or segment data elements) within the segment are displayed below. In FIG. 1, the segment fields include date opened, status date, maximum delinquency date, type, etc.

Using the segment fields, the user can enter in new values for all available data elements in each segment, modifying them as necessary to achieve thorough testing of the applicable decisioning logic. Repeating segments are preferably displayed in a row from left to right across the screen. Each segment has a series of editor tool buttons below it; the user can simply click on the appropriate button to execute the desired function. In FIG. 1, the editor tool buttons include "reset records," "reset segment data," and "add blank record."

Segment seeds are instances of existing segment information that can be stored for later use. There are two primary functions associated with segment seeds: storing and populating. The "store" function makes a copy of the current record and stores it as a segment seed that can be used in the future for populating other test data files. The "populate" function allows the user to fill in a segment quickly and easily, using an existing segment seed.

After a test data file is modified, it can be saved to the test data file storage unit, a file on the user's system, a file on a remote server, or a database. Based on the environment settings, the user has the ability to store test data files to multiple servers for quick and convenient retrieval.

Various other tools within the present invention allow increased functionality for manipulating test data files and their segment information. For example, the "sort" function allows the user to sort records within a test data file segment based on a specific field. For customized segment viewing, the segment positions can be manually reorganized within the test data file.

As noted above, the present invention can be used with both standard and XML test data files. Generally speaking, the process for creating and modifying test files is the same for XML files as for standard files.

3. The Test Set Editor

The test set editor allows the user to create and save a group of test data files in a test set. A test set is a group of test data files that are grouped together in a batch file. Test sets are generally designed to provide comprehensive testing for one component of the application logic. Test sets can be combined into larger test sets so that users can mix and match test sets to test any specific component(s) of a complete decisioning process. Test sets are based on the user's unique criteria and can be saved with a test set name and description.

Figure 4:
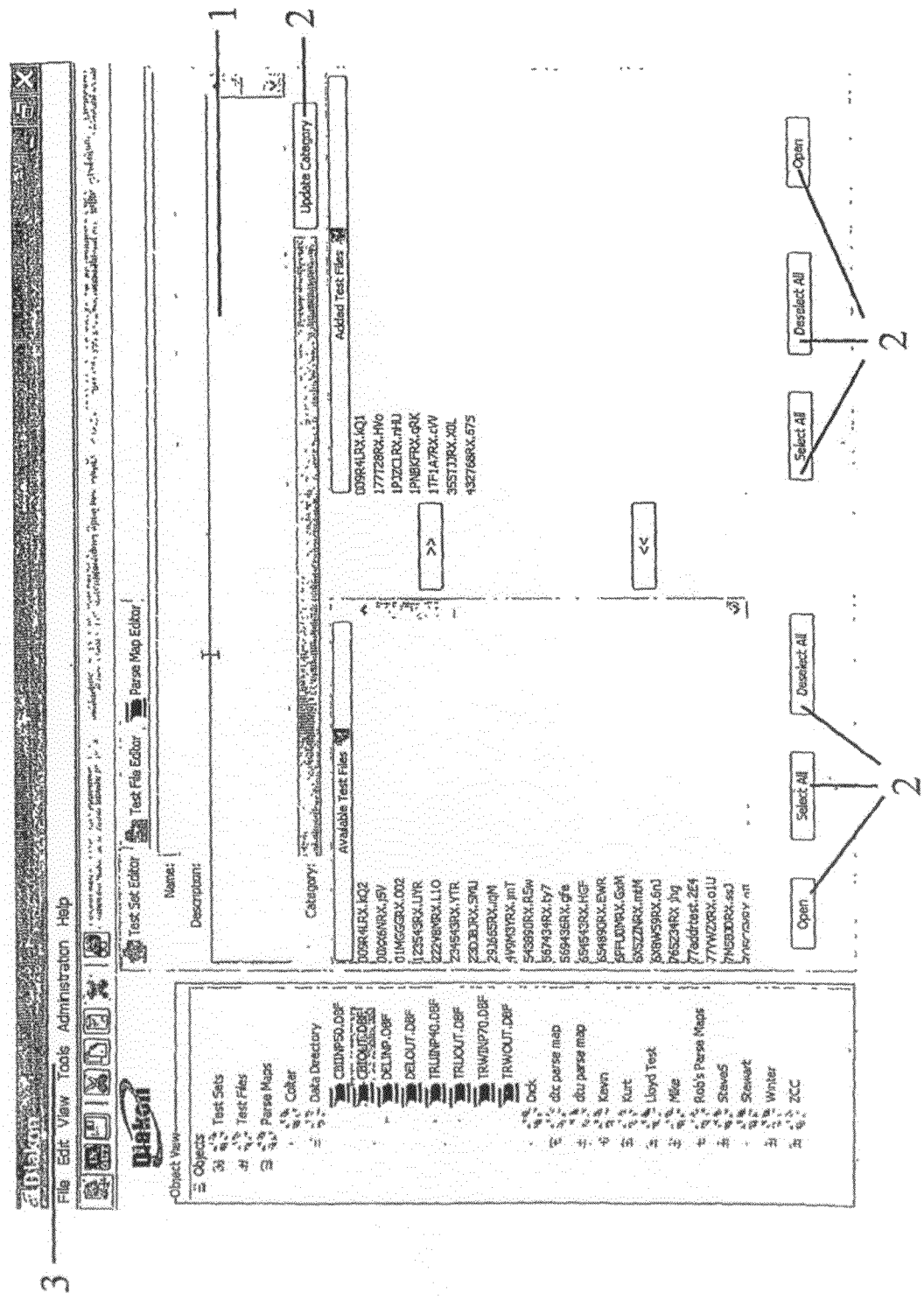
FIG. 4 is a screen shot of the object view tree with the test set editor displayed.

FIG. 4 is a screen shot of the object view tree with the test set editor displayed. Files listed in the available test files window are all of the test files in the system that have not been added to the current test set. All test files listed in the added test files window are the test files that the user has added to his or her current test set.

C. Additional Functionality

In addition to the three editors discussed above, the present invention offers a number of features that are not specific to any one editor. For example, the present invention includes a process for converting production data files to test data files by scrubbing out any personal data that should not be disclosed outside the process of granting credit. The scrubbing process includes identifying personal data elements in each data file format and developing a replacement or data scrambling routine to adjust the data in each one of these data elements.

The present invention also includes the ability to translate data files from one file format to another. In other words, the present invention can take data files that have similar data but are from different providers and come in different formats and convert that data from one format to another. Through the use of data mapping, the location of one data element in one format is mapped to the same data element in another format.

Data mapping may not be possible, however, when the data is not in a matching form or when there is no location in the second file format for the data that will be imported into that format. In that event, data in the first format must be converted from one file format to another through the use of computer code that tells the system what to do with the data when there is no corresponding field in the second file format.

This functionality allows users to build a credit file in one data format and translate that data file into another file format without having to build a credit file in each of the other data formats. Most large financial institutions use all three major credit bureaus, which means they would ordinarily need three different test sets to test against every logic condition. With this functionality, the user need only build one credit file in one data format, and then the system will translate that format to the other two credit bureau formats, thereby allowing the user to test the logic for all three credit bureaus at the same time.

Another feature of the present invention is the ability to conduct batch testing. In this regard, the present invention takes test inquiries and test data files (test inquiries being a type of test data file) and runs them through a decisioning engine to provide back results that can be used in an automatic regression evaluation or for manual review. Through batch testing, an actual production run can be simulated using test data files that have been previously created. The current process for batch testing test data files is to retrieve the test data files, hand enter the inquiries, make sure the inquiries match the test data files, run the data through the test process, and take the resulting data and put it into a format that can be regression tested. With the present invention, this entire process is automated.

DEFINITIONS

"Attribute" means individual data elements within a test data file segment.

"Category" or "categories" means the top-level grouping structure that allows users to nest, organize, and save objects.

"Edit Window" means the "work area" of the present invention where objects are created and edited.

"Editor" means one of three main displays within the present application: the test data file editor, the parse map editor, and the test set editor.

"Editor tab" means a navigational tool, located above the edit window, used to quickly move between editors.

"Editor tools" means a portion of the screen devoted to buttons, checkboxes, and search functions designed to assist in the creation and editing of objects.

"Menu bar" means the command line used for performing various functions within the present invention.

"Object" means any logical symbol used within the editor tool, such as a standard or XML test data file or a parse map.

"Object view" is the main navigation window in the present invention, and it is used to view and select objects.

"Parse map" is a readable file that reflects the system by which a test data file is parsed.

"Populate" means to fill a segment record with pre-existing data element values.

"Record" means an "iteration" of a segment, i.e., a distinct set of fields for the segment, into which data element values will be entered.

"Segment" means a distinct section of a test data file.

"Segment seed" means a pre-defined record that can be used to populate new segment records. To seed a segment is to auto-populate it with previously entered and saved data element values.

"Store" means to save a record and its component values for future use as a segment seed.

"Subcategory" or "subcategories" means a grouping structure that allows users to nest, organize, and save child objects under categories.

"Test data file" means a file used to simulate a stored credit bureau file for testing purposes.

"Test set" means a group of test data files that are grouped together in a batch file in the test data file editor. Test sets are based on the user's unique criteria and can be saved with a test set name and description.

"User-friendly name" means a name given to a test data file by the user.

"Value" means the value entered in a record for an attribute or data element.

"XML" means Extensible Markup Language.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention. All screen shots provided in connection with this disclosure are intended to illustrate the functionality of the present invention and should not be interpreted as limiting the scope of the present invention in any manner.

We claim:

1. A system for creating and modifying test data files comprising:
   (a) a monitor;
   (b) a memory;
   (c) a parse map editor; and
   (b) a test data file editor;
   wherein parse maps are created and edited in the parse map editor;
   wherein the system parses incoming test data files based on the parse maps that are created in the parse map editor;
   wherein each incoming test data file is matched to a parse map;
   wherein the parsed test data files are sent to the test data file editor;
   wherein the test data file editor allows a user to view and edit the parsed test data wherein the test data file editor automatically creates and modifies test data files;
   wherein the test data files are used to test a computer program having application logic, wherein the application logic comprises a set of conditions, wherein the test data files encompass all of the conditions within the application logic of tile computer program; and wherein the system identifies personal data elements in an incoming production data file, and a replacement or scrambling routine adjusts the data in each one of the personal data elements to convert the production data file to a test data file that can be used for testing purposes without any actual personal data.

2. The system of claim 1, wherein an incoming test data file is parsed into segments, and wherein the segments are parsed into segment data elements.

3. The system of claim 2, wherein the segments and segment data element are displayed in the test data file editor.

4. The system of claim 2, wherein the test data file editor allows users to create and modify the segments and segment data elements.

5. The system of claim 2, wherein each segment is displayed on its own screen, and wherein the screen definition for each segment is established by the parse map that is matched to the incoming test data file.

6. The system of claim 5, wherein the screen for each displayed segment comprises one or more editor tool buttons.

7. The system of claim 2, wherein each segment comprises a header, and each segment data element comprises a description.

8. The system of claim 2, wherein segments appear in the test data file editor in the order in which they are parsed.

9. The system of claim 2, further comprising one or more segment seeds, wherein a segment seed is a piece of segment information that can be stored for later use in populating test data files.

10. The system of claim 1, wherein the system parses fixed-length, variable-length and delimited test data files.

11. The system of claim 1, wherein the incoming test data files are provided by a data provider, wherein the data provider provides the incoming test data files in a native file format, and wherein the system can convert the parsed test data files back to the native file format.

12. The system of claim 1, wherein the incoming test data files are provided by a data provider, wherein the data provider provides the incoming test data files in a native file format, wherein each data provider has its own native file format, and wherein the system can translate an incoming test data file into the native file format of another data provider.

13. The system of claim 1, wherein the incoming test data files are flat files, and wherein when a user saves a parsed test data file, the system converts the parsed test data file back into a flat file and saves it in a designated location.

14. The system of claim 1, wherein the parse maps are xBase files.

15. The system of claim 1, wherein the incoming test data files are in either standard or XML file format, and wherein the system automatically determines the file format of the incoming test data files.

16. The system of claim 15, wherein incoming test data files that are in XML file format are parsed with a Sun Java SAX (Simple API for XML) parser.

17. The system of claim 1, further comprising an object view tree, wherein the object view tree comprises a parse map tree, and wherein the parse map tree comprises a data directory branch.

18. The system of claim 17, wherein the parse maps that are available to a user are shown in the data directory branch and determined by the user's environment settings.

19. The system of claim 1, wherein the incoming test data file is matched to a parse map either by the system automatically or by the user by selecting the parse map from a menu.

20. The system of claim 1, further comprising a test set editor, wherein the test set editor allows a user to create and save a group of test data files in a test set.

21. The system of claim 1, further comprising a test data file storage unit, wherein a test data file can be saved to the test data file storage unit after it is viewed or modified in the test data file editor.

22. The system of claim 1, wherein the parsed test data files are run through a decisioning engine to provide results that can be used in an automatic regression evaluation or for manual review.

23. The system of claim 1, wherein batch testing can be used to simulate an actual production run.

24. A method of creating and modifying test data files comprising:
(a) parsing an incoming test data file with a parse map;
(b) creating and/or editing the parse map in a parse map editor; and
(c) viewing and/or editing the parsed test data file in a test data file editor;

wherein the test data file editor automatically creates and modifies test data files; and wherein the test data files are used to test a computer program having application logic, wherein the application logic comprises a set of conditions, wherein the test data files encompass all of the conditions within the application logic of the computer program, wherein each incoming test data file is matched to a parse map, wherein the parsed test data tiles are sent to the test data file editor, and scrubbing all personal data from an incoming production data file by identifying personal data elements in each incoming production data file and using a replacement or scrambling routine to adjust the data in each personal data element to convert the production data file to a test data file.

25. The method of claim 24, wherein an incoming test data file is parsed into segments, and wherein the segments are parsed into segment data elements.

26. The method of claim 25, wherein the segments and segment data element are displayed in the test data file editor.

27. The method of claim 25, wherein the test data file editor allows users to create and modify the segments and segment data elements.

28. The method of claim 25, wherein each segment is displayed on its own screen, and wherein the screen definition for each segment is established by a parse map that is matched to the incoming test data file.

29. The method or claim 28, wherein the screen for each displayed segment comprises one or more editor tool buttons.

30. The method of claim 25, wherein each segment comprises a header, and each segment data element comprises a description.

31. The method of claim 25, wherein segments appear in the test data file editor in the order in which they are parsed.

32. The method of claim 25, wherein a segment can be broken down into one or more segment seeds, and wherein a segment seed is a piece of segment information that can be stored for later use in populating test data files.

33. The method of claim 24, wherein the incoming test data file is a fixed-length data file, a variable-length data file, or a delimited data file.

34. The method of claim 24, wherein the incoming test data files are provided by a data provider, wherein the data provider provides the incoming test data files in a native file format, and wherein the parsed test data files can be converted back to the native file format.

35. The method of claim 24, wherein the incoming test data files are provided by a data provider, wherein the data provider provides the incoming test data files in a native file format, wherein each data provider has its own native file format, and wherein an incoming test data file can be translated from one native file format to another.

36. The method of claim 24, wherein the incoming test data files are flat files, and wherein when a user saves a parsed test data file, the parsed test data file is converted back into a flat file and saved in a designated location.

37. The method of claim 24, wherein the parse maps are xBase files.

38. The method of claim 24, wherein the incoming test data files are in either standard or XML file format, and wherein the file format of the incoming test data file is determined automatically.

39. The method of claim 38, wherein incoming test data files that are in XML file format are parsed with a Sun Java SAX (Simple API for XML) parser.

40. The method of claim 24, further comprising providing an object view tree, wherein the object view tree comprises a parse map tree, and wherein the parse map tree comprises a data directory branch and a database branch.

41. The method of claim 40, wherein parse maps that are available to a user are shown in the data directory branch and determined by the user's environment settings.

42. The method of claim 24, wherein the incoming test data file is matched to a parse map either automatically or by a user selecting the parse map from a menu.

43. The method of claim 24, further comprising providing a test set editor, wherein the test set editor allows a user to create and save a group of test data files in a test set.

44. The method of claim 24, further comprising providing a test data file storage unit, wherein a test data file can be saved to the test data file storage unit after it is viewed or modified in the test data file editor.

45. The method of claim 24, wherein the parsed test data files are run through a decisioning engine to provide results that can be used in an automatic regression evaluation or for manual review.

46. The method of claim 24, further comprising using batch testing to simulate an actual production run.

* * * * *